United States Patent [19]

Scott

[11] 4,261,148

[45] Apr. 14, 1981

[54] APPARATUS FOR HOLDING BOARDS IN THE MAKING OF FURNITURE

[76] Inventor: Steve M. Scott, 999 S. Logan, Denver, Colo. 80209

[21] Appl. No.: 38,861

[22] Filed: May 14, 1979

[51] Int. Cl.³ .......................... E04B 1/38; E04C 1/30
[52] U.S. Cl. ...................................... 52/285; 52/586; 403/403; 403/295; 217/65
[58] Field of Search ............... 403/205, 293, 295, 403; 217/65, 69, 70; 52/282, 285, 286, 281

[56] References Cited

U.S. PATENT DOCUMENTS

| | | |
|---|---|---|
| 1,067,792 | 7/1913 | Baron . |
| 2,082,159 | 6/1937 | Hansen .................................. 52/586 |
| 2,882,564 | 4/1959 | Couse et al. . |
| 2,960,249 | 11/1960 | Walsh . |
| 3,102,615 | 9/1963 | Tuttle .................................... 52/286 |
| 3,276,797 | 10/1966 | Humes . |
| 3,310,917 | 3/1967 | Simon .................................. 52/586 |
| 3,310,926 | 3/1967 | Brandreth et al. ..................... 52/281 |
| 3,563,582 | 2/1971 | Shroyer . |
| 3,603,053 | 9/1971 | Van Loghem et al. . |
| 3,950,915 | 4/1976 | Cole . |

FOREIGN PATENT DOCUMENTS 1496559 8/1967 France ...................................... 52/586

Primary Examiner—James L. Ridgill, Jr.
Attorney, Agent, or Firm—Robert C. Dorr

[57] ABSTRACT

An apparatus for holding a first rectangular board in a predetermined orientation to a second rectangular board. A holding apparatus is disclosed comprising a corner member having a first flat edge substantially corresponding in dimension to the width and thickness of a squared edge of the first board and a second flat edge located at a predetermined orientation from the first flat edge also corresponding in dimension to the width of the squared edge of the second board. Each flat edge of the corner member has an elongated protrusion, in the shape of a wedge, extending outwardly at a midpoint region. The protrusion engages a correspondingly formed tapered slot in the squared edges of the first and second boards. Bonding means is applied to the flat edges and protrusions to engage the squared end and tapered slot of each board.

2 Claims, 9 Drawing Figures

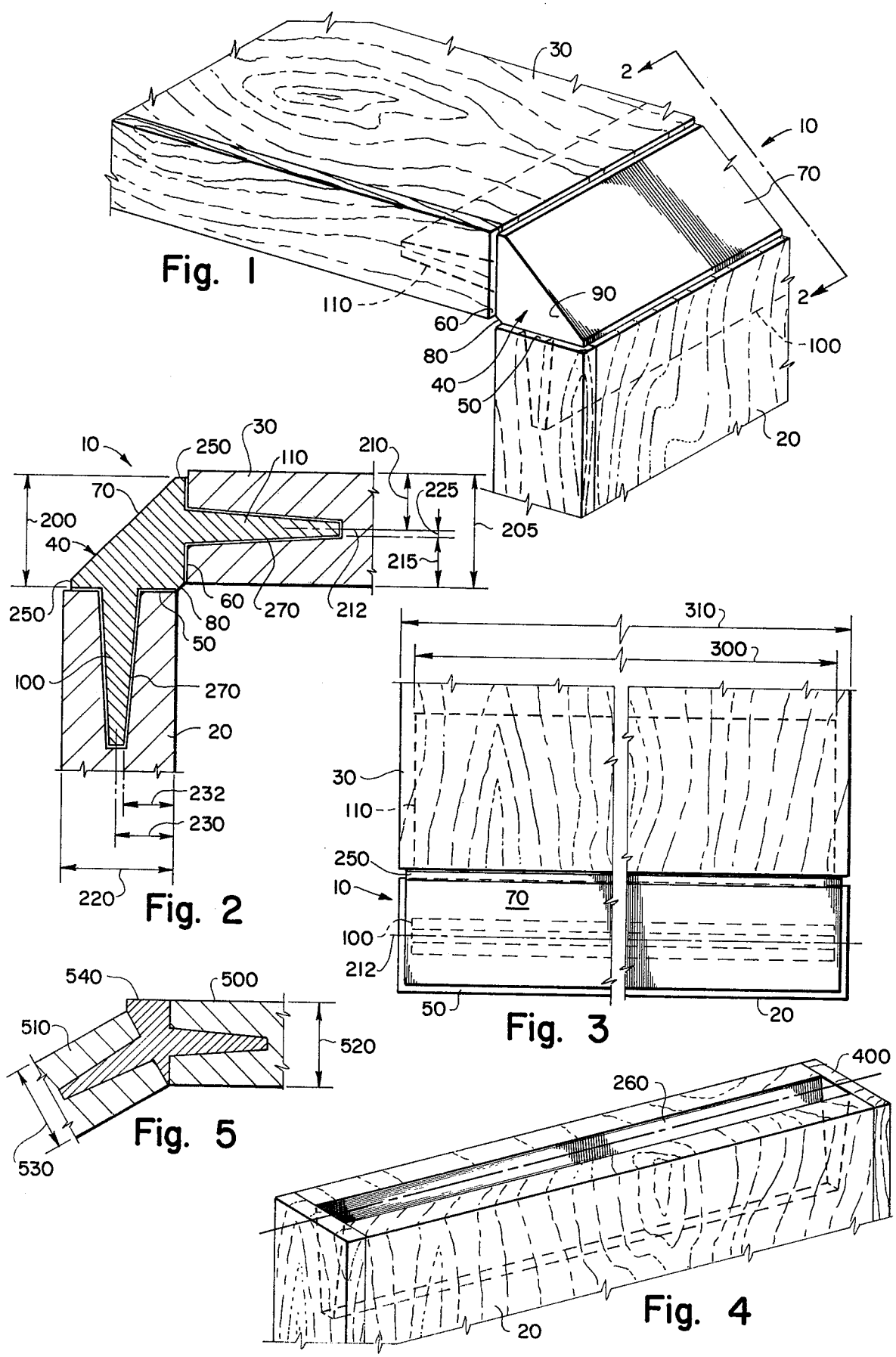

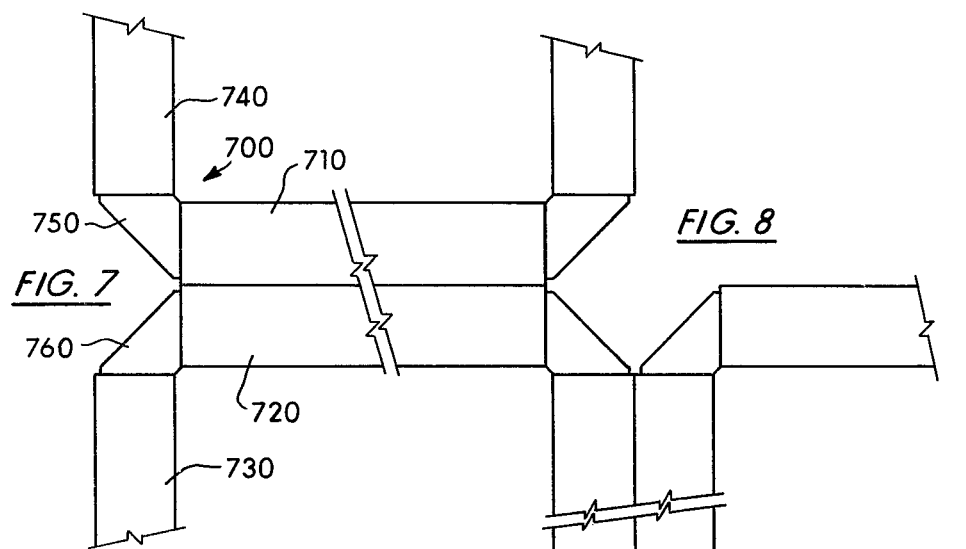
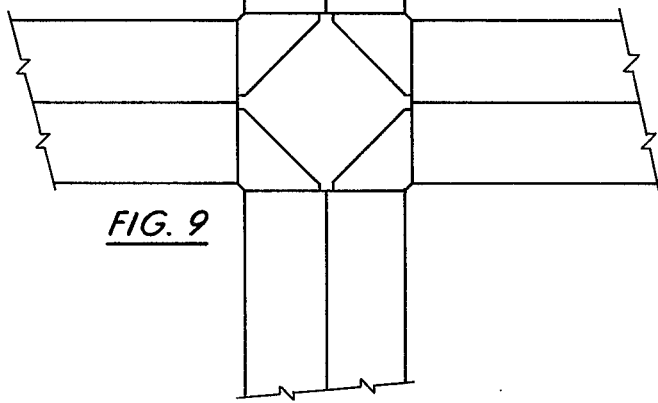
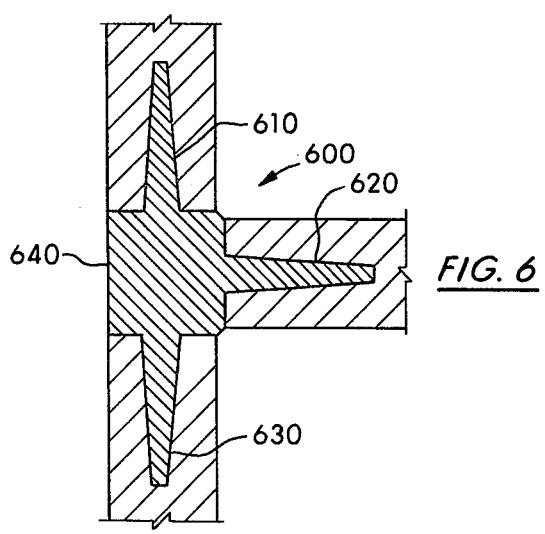

APPARATUS FOR HOLDING BOARDS IN THE MAKING OF FURNITURE

BACKGROUND OF THE INVENTION

1. Field of the Invention

The present invention relates to device for holding boards in predetermined orientations in the making of furniture and more particularly to devices for holding two boards in perpendicular relationship.

2. Discussion of the Prior Art

The prior art in this field is extensive and the following patents were uncovered in a patentability search:

| Inventor | U.S. Pat. No. | Date |
|---|---|---|
| Baron | 1,067,792 | July 22, 1913 |
| Couse et al | 2,882,564 | April 21, 1959 |
| Walsh | 2,960,249 | November 15, 1960 |
| Humes, Jr. | 3,276,797 | October 4, 1966 |
| Simon | 3,310,917 | March 28, 1967 |
| Shroyer | 3,563,582 | February 16, 1971 |
| Van Loghem et al | 3,603,053 | September 7, 1971 |
| Cole | 3,950,915 | April 20, 1976 |

The 1960 patent issued to Walsh (U.S. Pat. No. 2,960,249) sets forth an interlocking strip 15 which is used to engage two wood members in perpendicular relationship. The interlocking strip 15, as shown in FIG. 2, is of a tongue 29 and groove 28 relationship. Gule can be utilized to bind the interlocking strip 15 to the frame members.

The 1971 patent issued to Shroyer (U.S. Pat. No. 3,563,582) sets forth a spline joint for joining wooden members in contiguous relationship. The spline is illustrated in FIG. 1 and is shown engaging the partition member 16 in FIG. 2.

The 1971 patent issued to Von Loghem et al (U.S. Pat. No. 3,603,053) teaches the use of a connecting member, shown in FIG. 3 for holding wood members in perpendicular relationship as shown in FIG. 1. A variety of embodiments is shown throughout the drawing. The connecting member of this invention is adapted to be received by a dovetailed slot.

The 1966 patent issued to Humes, Jr. (U.S. Pat. No. 3,276,797) also sets forth a spline fastening device as best shown in FIGS. 11 and 12, for holding wood members in perpendicular relationship. The spline shown in this invention is adapted to be received by cut slots, for example, slot 65. The spline has a plurality of teeth 58 disposed on alternating tongues 52.

The 1976 patent issued to Cole (U.S. Pat. No. 3,950,915) also sets forth a spline as shown in FIG. 1 for holding wood members in perpendicular relationship as best shown by FIG. 6. One part of the spline engages a dovetail groove while the other opposing portion engages a slot as best shown in FIGS. 3 and 4.

The 1913 patent issued to Baron (U.S. Pat. No. 1,067,792) sets forth a spline as shown in FIG. 4, designated 11 for holding two wood members in perpendicular relationship.

The 1959 patent issued to Couse et al (U.S. Pat. No. 2,882,564) also sets forth a hinge-like spline which is best shown in FIGS. 4 and 5, holds two wood members in perpendicular relationship.

Finally, the 1967 patent issued to Simon (U.S. Pat. No. 3,310,917) sets forth spline members that are generally v-shaped in cross-section. The splines are splayed outwardly as shown in FIGS. 3 and 4.

All of the above prior art approaches relate in some fashion to splines for holding wood members (or the like) in perpendicular (or jointed) relationship. In particular, the Simon reference sets forth, as shown in FIG. 4, a spline for holding two panels in perpendicular relationship wherein the outer surface of the spline (39) is finished and where arrow-shaped inwardly protruding members are disposed into correspondingly shaped recesses of the wood members. However, the approach of the present invention is distinguishable from Simon and the above prior art in that splayed outward connections are not utilized. Hence, the present invention is less costly to manufacture thereby resulting in a savings to the eventual consumer. Furthermore, other structural differences between the present invention and the prior art approaches are apparent as will be set forth in the following.

OBJECTS OF THE INVENTION

An object of the present invention is to provide a novel apparatus for holding a first board in predetermined orientation to a second board.

It is a further object of the present invention to provide a new and novel apparatus for holding a first board in a predetermined orientation to a second board wherein a corner member utilizes a first extending protrusion to engage the squared end of the first board and a second extending protrusion oriented at a predetermined orientation to the first protrusion for engaging the squared end of a second board.

It is a further object of the present invention to provide a new and novel apparatus for holding a first board in a predetermined orientation to a second board wherein the exposed surfaces of the holding apparatus are finished.

SUMMARY OF THE INVENTION

An apparatus for holding a first rectangular board member in a predetermined orientation to a second rectangular board member or forming a furniture joint. Each of the first and second board members has at least one end squared with the mid point of the tapered slot formed at the longitudinal center of the thickness of the board and extending centered but slightly less than the width of the board.

The holding apparatus comprises in a longated corner member having a formed exterior surface of predetermined configuration and finish, a first flat surface extending from said finished surface having an outwardly extending tapered protrusion extending the length of the corner member and oriented on a line slightly offset towards said angled exterior surface from the mid point of said flat side, a second finished surface extending from said first extending side, a second extending flat side oriented in a predetermined angle from said first flat side, and outwardly extending tapered protrusion extending the length of the corner member and oriented on a line slightly offset toward the first angled finished surface, and a second angled finished surface between the juncture of the first and second flat sides.

A binder is applied to the first and second flat sides and the protrusions and the first and second rectangular board members are affixed thereto.

Other objects, advantages and capabilities of the present invention will become more apparent as the description proceeds taken in conjunction with the accompanying drawing.

DESCRIPTION OF THE DRAWING

FIG. 1 is a prespective view of the holding apparatus of the present invention holding two boards in perpendicular engagement, FIG. 2 is a cross sectional view taken along section lines 2—2 of FIG. 1, FIG. 3 is a top plainer view of the holding apparatus of the present invention holding two boards in perpendicular engagement, FIG. 4 is a partial prespective view showing the squared end in formed tapered slot of a board, and FIG. 5 is an illustration showing a modification of the present invention, FIG. 6 is a cross-sectional view of a modification of the present invention, FIG. 7 is an illustration setting forth two holding apparatuses in stacked relationship, FIG. 8 is an illustration setting forth three holding apparatuses in stacked relationship, FIG. 9 is an illustration setting forth four apparatuses in stacked relationship.

DETAILED SPECIFICATION

In FIG. 1, the holding apparatus 10 of the present invention is shown holding two boards 20 and 30 in perpendicular relationship.

The holding apparatus 10 includes a corner member 40 made from solid metal such as, for example, aluminum. Corner member 40 has formed thereon a first flat surface 50 and a second flat surface 60 which is perpendicular to surface 50. Formed between the farthest ends of surfaces 50 and 60 is a first finished angled surface 70. Finished angled surface 70, shown in FIG. 1, is shown to be a flat angled surface which may have a conventional wood grain covering disposed thereon. Any suitable surface configuration, however, can be provided including an arcuate surface. A second finished surface 80 is formed between the nearest two ends of surfaces 50 and 60 on the corner member 40. Again, the second finished interior surface 80 is shown to be flat and angular, although any suitable surface may be utilized. The ends 90 of the corner member 40 may also be of any suitable configuration in finish.

Formed on each of the surfaces 50 and 60 is an outwardly extending protrusion or spline 100 and 110 respectively. These protrusions 100 and 110 engage fitted slots formed in boards 20 and 30. The holding apparatus 10 of the present invention uses glue of other suitable bonding means applied to flat surfaces 50 and 60 and to the entire surfaces or protrusions 100 and 110. In this fashion, boards 20 and 30 are held in perpendicular engagement and are firmly bonded due to the large surface area of engagement.

It is to be expressly understood that the teachings of the present invention are not limited to the perpendicular relationship shown in FIG. 1. Rather, surfaces 50 and 60 can be oriented at any predetermined angle on body member 40 to provide a desired angular relationship between boards 20 and 30.

For example, in FIG. 5, the boards 500 and 510 are of different thicknesses 520 and 530, the angular relationship is nonperpendicular, the finished exterior surface 540 is of a corner configuration, and a second interior finished surface is not utilized.

FIG. 2 sets forth the details of the holding apparatus 10 of the present invention in a cross-sectional view. The corner member 40 and the protrusions 100 and 110 are integral in construction and are manufactured by an extrusion process. The body member 40 has a first flat edge 60 having a width 200 slightly less than, but substantially corresponding in dimension to the thickness 205 of board 30. The protrusion 110 is oriented to be aligned with the longitudinal center 210 of the thickness 205, and, therefore, slightly offset from the longitudinal center 215 of the width 200. The offset 225 is the difference between the positions of the two centerlines 210 and 215. Under the teachings of the present invention, the protrusion 110 can align with centerline 215, substantially align therewith, or be substantially offset by on amount 225 therefrom. The protrusion 110 tapers as for a wedge in thickness from an increasing thickness at surface 60 to a minimum thickness at its end 212. The end 212 is blunt as shown in FIG. 2.

A second flat edge 50 is formed on body member 40 perpendicular (or at any desired predetermined orientation) to surface 60. The width 220 of surface 50 substantially corresponds to the thickness of the board member 20. Again, the protrusion 110 is aligned along the longitudinal center 230 of board 20. In the preferred embodiment, the configuration of protrusion or spline 100 is identical to that of protrusion 110.

It is to be noted, that the width 200 and 220 of flat surfaces 60 and 50, respectively, may vary for different thicknesses of boards 20 and 30 as shown in FIG. 5.

The interior finished surface 80 extends between the nearest ends of surfaces 50 and 60 whereas the exterior finished surface 70 extends between the farthest ends of surfaces 50 and 60. In FIG. 2, exterior finished surface 70 at opposite ends terminates in a surface 250 which is coplanar with the respective board member 20 or 30. The provision of surface 250 is optionable and may be eliminated.

As will be discussed subsequently, a tapered slot 260 is formed in board members 20 and 30. A bonding material such as glue is used to bind the surfaces 50 and 100 to the end of board 20 and the formed slot to 60. The same is true for board 30.

In FIG. 3 a top view of the holding apparatus 10 of the present invention is shown. Specifically, it is to be noted that the length 300 of the apparatus is slightly less than the width 310 of the board 20. This relationship is desirable in that, as shown in FIG. 1, there is no exposure of protrusion 100 or 110 to the external view of the furniture.

Furthermore, in FIG. 3, the positioning of the protrusion 110 in final engagement with board member 30 is shown to be engaging the centerline 210 of board 30. Hence, by inspection of FIG. 3, it is seen that if surface 80 is eliminated and surfaces 60 and 50 are perpendicular to each other the centerline 210 of the protrusion 110 would align with the centerline 215 of board 30.

In FIG. 4, a tapered slot 260 is shown formed in the squared end 400 of board 20 at the centerline. Under the above teachings of the present invention, the boards are first prepared with squared ends 400 and then a slot 260 is routed along the centerline. Glue or a suitable bonder 270 is applied to the holding apparatus 10 of the present invention on surfaces of the protrusion 100 and edges 50. The protrusion of the holding apparatus 10 is then inserted into the slot 260 and allowed to dry.

In FIG. 6, an alternate embodiment 600 for the present invention is shown. In this embodiment, three splines 610 are shown wherein spline 620 is perpendicular to splines 610 and 630, the latter two oriented in the same plane. Of course, additional modifications could be made to have more splines at differing orientations.

Finally, in FIGS. 7 through 9, the holding apparatus of the present invention, as shown in FIG. 1, is illustrated being stacked in orientation to each other. For example in FIG. 7, holding apparatus 750 is shown to firmly engage boards 710 and 740 while holding apparatus 760 engages boards 720 and 730. In the stacked relationship of FIG. 7, boards 710 and 720 abut each other in planar engagement and the holding apparatuses 750 and 760 do not abut each other.

I claim:

1. An apparatus for holding a first rectangular board perpendicular to a second rectangular board, each of said boards having at least one end squared with the midpoint of a tapered slot formed at the longitudinal center of the thickness of the board and extending substantially the width of the board, said apparatus comprising:

a corner member having:
   (a) a first flat edge substantially corresponding in dimension to the width and thickness of the square edge of said first board, said first edge having an elongated tapered protrusion extending outwardly, said protrusion having its longitudinal center slightly offset from the midpoint of the thickness of said edge and extending substantially, but slightly less than the entire width of said edge, said protrusion being configured to fully mate with the tapered slot of said first board, said offset causing said first board to extend beyond said first flat edge a predetermined amount.
   (b) a second flat edge located at a predetermined orientation from said first flat edge substantially corresponding in dimension to the width and thickness of the squared edge of said second board, said second edge having an elongated tapered protrusion extending outwardly, the aforesaid protrusion having its longitudinal center slightly offset from the midpoint of the thickness of said edge and extending substantially, but slightly less than the entire width of said edge, the aforesaid protrusion being configured to fully mate with the tapered slot of said second board, the aforesaid offset causing said second board to extend beyond said second flat edge said predetermined amount;
   (c) a first exterior surface extending between the farthest ends of said first and second flat edges, and
   (d) a second exterior surface extending between the nearest ends of said first and second flat edges glue applied to said first flat edge and extending tapered protrusion for bonding said first flat edge and protrusion to said squared end and tapered slot of said first board member, and glue applied to said second flat edge and extending tapered protrusion for bonding said second flat edge and protrusion to said squared end and tapered slot of said second board member.

2. An apparatus for holding a first rectangular board member in a predetermined orientation to a second board member, each of said first and second board members having at least one end squared with the midpoint of a tapered slot formed at the longitudinal center of the thickness of the board and extending centered but slightly less than the width of the board, said apparatus comprising:

an elongated corner member having:
   (a) an angled exterior surface,
   (b) a horizontal extension on the upper end of said angled surface of said corner member having an exterior horizontal surface integral with said angled exterior surface,
   (c) a vertical side to said corner member extending downwardly from said exterior horizontal surface,
   (d) an outwardly horizontally extending tapered protrusion extending the length of said corner member and oriented on a line slightly offset toward said angled exterior surface from the midpoint of said vertical side,
   (e) a vertical extension on the lower end of said angled surface having a exterior vertical surface integral with said angled exterior surface,
   (f) a horizontal side to said corner member extending toward said vertical side,
   (g) an outwardly vertically extending downward tapered protrusion extending the length of said corner member and oriented on a line slightly offset toward said angled exterior surface from the midpoint of said horizontal side,
   (h) an angled exterior glue applied to said vertical tapered protrusion and to said horizontal side for binding said vertical tapered protrusion to the interior surface of said tapered slot of said second member and for binding said end of said second member to said vertical side.

* * * * *